(12) United States Patent
Xu et al.

(10) Patent No.: US 8,584,100 B2
(45) Date of Patent: Nov. 12, 2013

(54) BRIDGING CODE CHANGES AND TESTING

(75) Inventors: Xiaochun Xu, Heidelberg (DE);
Yangning Peng, Wiesloch (DE)

(73) Assignee: SAP AG, Walldorf (DE)

( * ) Notice: Subject to any disclaimer, the term of this patent is extended or adjusted under 35 U.S.C. 154(b) by 886 days.

(21) Appl. No.: 12/635,412

(22) Filed: Dec. 10, 2009

(65) Prior Publication Data
US 2011/0145788 A1 Jun. 16, 2011

(51) Int. Cl.
*G06F 9/44* (2006.01)

(52) U.S. Cl.
USPC .......................................... 717/132; 717/126

(58) Field of Classification Search
USPC .................................................. 717/124–135
See application file for complete search history.

(56) References Cited

U.S. PATENT DOCUMENTS

| | | | |
|---|---|---|---|
| 5,673,387 A | 9/1997 | Chen et al. | |
| 2003/0204836 A1 | 10/2003 | Srivastava et al. | |
| 2006/0168565 A1* | 7/2006 | Gamma et al. | 717/122 |
| 2007/0214391 A1 | 9/2007 | Castro et al. | |
| 2009/0138855 A1 | 5/2009 | Huene et al. | |

OTHER PUBLICATIONS

Ren, "Change Impact Analysis for Java Programs and. Applications", Oct. 2007, Rutgers, The State University of New Jersey, Thesis, pp. i-xiii, 1-116.*

Tonella, "Using a Concept Lattice of Decomposition Slices for Program Understanding and Impact Analysis", Jun. 2003, IEEE, pp. 495-509.*
Extended European Search Report for EP Application No. 10015534.0, mailed Feb. 22, 2011, 8 pages.
Loyall, et al, "Impact Analysis and Change Management for Avionics Software", Proceedings of the IEEE 1997 National Aerospace and Electronics Conference, vol. 2, Jul. 14, 1997, pp. 740-747.
Extended EP Search Report for EP Application No. 11004203.3, mailed Dec. 6, 2011, 4 pages.
"HP Change Impact Testing Module for SAP Applications", User Guide, Software Version 2.60, Oct. 2011, 64 pages.
"Measure Your Software Quality to Identify Risk", McCabe IQ Developers Edition, Dec. 2, 2009, 4 pages.
Elbaum, et al, "Code Churn: A Measure for Estimating the Impact of Code Change", Proceedings of the International Conference on Software Maintenance, Nov. 1998, 8 pages.
Kung, et al, "Change Impact Identification in Object Oriented Software Maintenance", Proceedings of the International Conference on Software Maintenance, Sep. 1994, 20 pages.

* cited by examiner

*Primary Examiner* — Ted T Vo
(74) *Attorney, Agent, or Firm* — Brake Hughes Bellermann LLP

(57) ABSTRACT

Method and system for testing software code comprising determining code elements in software code, determining changed code elements in the software code, determining dependencies between code elements, determine dependency changes between code elements based on the determined changed code elements, determining an impact factor for the respective changed code elements based on the determined dependency changes, determine a test relevancy ranking for code tests based on the determined impact factor, selecting tests for the software code based on said test relevancy ranking, and performing the selected tests on the software code.

20 Claims, 9 Drawing Sheets

BRIDGING CODE CHANGES AND TESTING

TECHNICAL FIELD

The disclosed subject matter relates to test systems and methods in general and code change test systems and methods in particular.

BACKGROUND

In software maintenance and development, testing is needed to ensure that the software satisfies the given requirements. One area of interest includes changes to existing code, being it either for subsequent steps during initial development or changes made later to the code in the form of updates or upgrades. State of the art quality control means that testing is required to ensure that all functionality is as required by the specifications, either initial or updated.

To this end typically code-changes define the need for test activities and to provide predictions on the impact of code-changes on the product quality. In the case of object oriented programming, the relationships between the objects are important as changes in the software, which often includes changes to or within the objects, can have complex results. It is not rare that even a very small change in coding can cause a large amount of functionalities to fail.

Testing software changes in object oriented programming is known in the art. The data structures and member functions of the object classes in object oriented programming can be examined with relative easy. However, understanding the combined effects of all possible interrelations between the changed and unchanged code and objects is not trivial. A comprehensive full test that encompasses all changes is in time and effort beyond the scope for all but the most trivial programs, as the calculation times soon reach timeframes of multiple centuries and more.

It is therefore an example object of the disclosed subject matter, to which the disclosed subject matter is not limited, to provide for a method of testing software systems that provides better results, for instance by getting better test results with the same or less effort.

To achieve these and other goals the method according to the disclosed subject matter provides for a selection means to determine the relevance of possible tests. By testing the more relevant section of changes to the code, the test capacity is used to achieve better test quality.

In a different aspect of the disclosed subject matter, the selection means is used to make a better assessment of code changes on product quality. This can be of advantage during development or maintenance to estimate the quality of and risk to the changed code already before the final release has been established.

SUMMARY

By determining the dependent software units in computer code a dependency graph for the code is determined. Furthermore, the code changes in the dependent software units, for instance by tracking transports, are analyzed and tracked. The changes in the dependency graph itself are analyzed and tracked. By quantitatively assessing the impact of the respective code changes on the test case by means of different key impact factors, rankings over the key impact factors for the considered test cases can be determined. Based on the ranking, tests can be determined. By making a selection of test to be performed, based on the determined code complexity and code evolution in the form of code changes, software testing can be optimized with respect to the available resources, improve predictions of tests on quality. The determined test are then conducted and the results determined, stored and reported.

According to the disclosed subject matter a system is provided comprised of a software unit dependency graph generator, a dependent software unit collector, a software unit dependency analyzer, a code change tracker and an impact assessment engine. In one embodiment of the disclosed subject matter the system is provided with a computer landscape.

The details of one or more implementations are set forth in the accompanying drawings and the description below. Other features will be apparent from the description and drawings, and from the claims.

DETAILED DESCRIPTION

Figure 1:
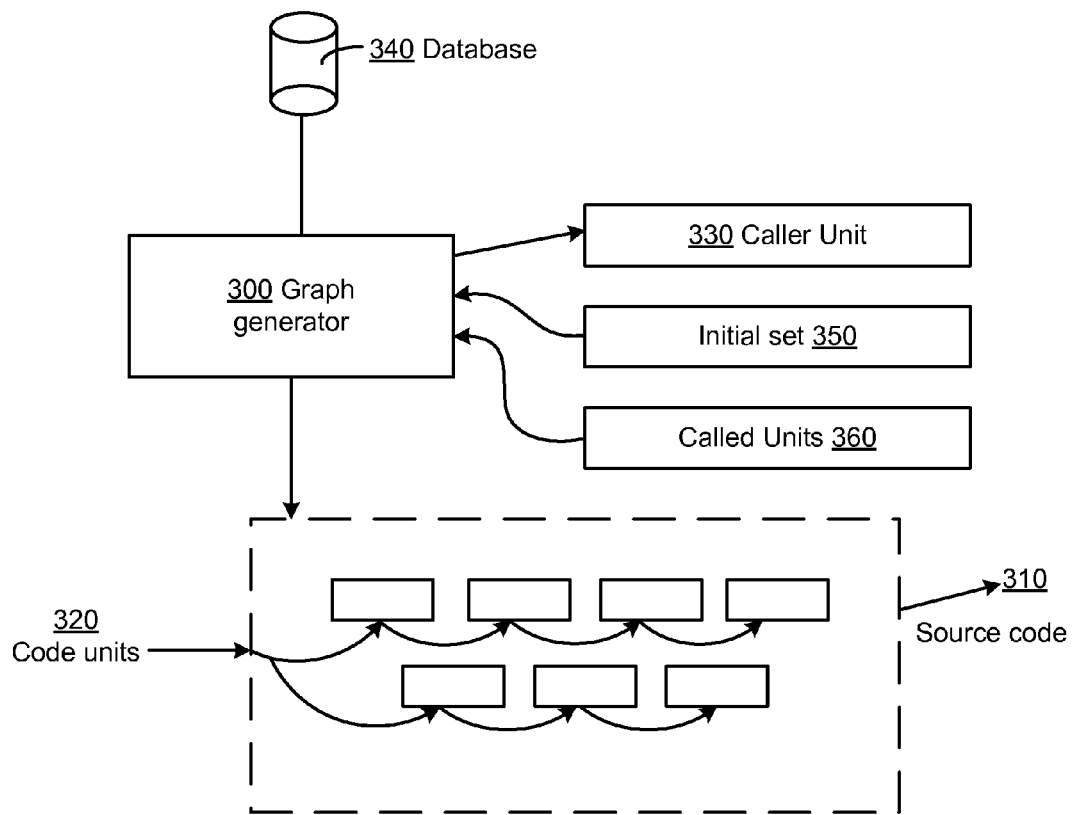
FIG. 1 is a representation of an example of an embodiment of the disclosed subject matter.

In the following description of an example of an implementation of the disclosed subject matter, the programming language Advanced Business Application Programming (ABAP) is used. ABAP is a known fourth generation language, used to program business systems. ABAP has an extension, ABAP Objects, making it capable of object oriented programming. ABAP programs reside in a system database, usually in both source code and generated code. The source code can be inspected and edited with for example an editor tool, like the ABAP workbench. The ABAP programs execute in a runtime system that is part of a kernel. The kernel takes care of processing ABAP statements, screen logic and event responses.

The ABAP language environment, including the syntax checking, code generation and runtime system, is part of a basis component, like for instance SAP Basis. SAP Basis is a computer technological platform that supports software applications, for example implemented in the framework of a SAP web application server. SAP Basis functions as an operating system on which ABAP applications run. Like any operating system, SAP Basis contains both low-level services, as for example memory management, database communication or servicing Web requests, and high-level tools for end users and administrators. These tools can be executables in for example the SAP kernel running directly on the underlying operating system, transactions developed in ABAP, or Web-based interfaces. Although, it is understood that the above is merely one illustrative example to which the disclosed subject matter is not limited.

Typically, SAP data exists and all SAP software runs in the context of an SAP system. Again, it is understood that an SAP system is merely one example embodiment to which the disclosed subject matter is not limited. A system consists of a central relational database and one or more application servers or instances, accessing the data and programs in this database. An SAP system contains at least one instance but may contain more, mostly for reasons of sizing and performance. In a system with multiple instances, load balancing mechanisms ensure that the load is spread evenly over the available application servers.

Installations of the web application server, exemplary implemented in computer system landscapes, typically comprise three systems: one for development, one for testing and quality assurance, and one for production. The landscape may contain more systems, for instance separate systems for unit testing and pre-production testing, or it may contain fewer, for instance only development and production, without separate quality assurance. Typically, ABAP programs are created and undergo first testing in the development system. Afterwards they are distributed to the other systems in the landscape. These actions take place under control of the change and transport system (CTS), which is responsible for concurrency control for instance to prevent two developers from changing the same code at the same time, version management and deployment of programs on the quality assurance and production systems.

The web application server itself consists of three layers: the database layer, the application layer and the presentation layer. These layers may run on the same or on different physical machines. The database layer contains the relational database and the database software. The application layer contains the instance or instances of the system. All application processes, including the business transactions and the ABAP development, run on the application layer. The presentation layer handles the interaction with users of the system. Online access to ABAP application servers can go via a proprietary graphical interface, the SAPGUI, or via a Web browser.

As a fourth generation programming language, ABAP supports object oriented programming. As ABAP supports computer programming for applications in a business environment it supports typical objects in a business environment are, for example, 'Customer', 'Order', or 'Invoice'. These objects can be stored in a business object repository; such objects are integrated in ABAP Objects and belong to the ABAP class library. Objects are instances of classes, and can contain data and can provide services. Data forms the attributes of the object. The services can also be regarded as methods such as operations or functions. Typically, methods operate on private data like for instance the attributes, or state of the object, which may be only visible to the methods of the object. Thus the attributes of an object cannot be changed directly by the user, but only by the methods of the object. This guarantees the internal consistency of the object. Classes can describe objects, and furthermore, objects can be runtime instances of a class. Each instance or object of a class has a unique identity and its own set of values for its attributes. Object references in a program can be identified and addressed by objects by using unique object references. Object references can be used to access the attributes and methods of an object.

In ABAP, as in most object-oriented programming, objects can have the following properties: encapsulation, inheritance, and polymorphism. With encapsulation objects restrict the visibility of their resources, in particular attributes and methods to other users. Every object has an interface, which determines how other objects can interact with it. The implementation of the object is encapsulated, that is, invisible outside the object itself. Inheritance means that an existing class can be used to derive a new class. Derived classes inherit the data and methods of a super class. Polymorphism refers to the feature that identical or identically-named methods behave differently in different classes. In ABAP objects, polymorphism is implemented by redefining methods during inheritance and by using interfaces.

In the following, software code is comprised of software units, where a software unit is the smallest traceable coding unit for a software logistics perspective. In an example of for instance ABAP or any other object oriented fourth generation programming language, these can comprise objects. The set of all software units is called the set of software units, denoted as S, where the software code is identical to the set of software units, or the set of software units is a subset of the software code. A direct dependency between two software units (for example software units x and y) is denoted as $x \rightarrow y$. An example of a direct dependency can be a direct call from x to y. A software unit dependency graph G is defined as G=(S, C), wherein C is the set of direct dependencies as defined by $C = S \times S$. For a given system and at time t, the software unit dependency graph is denoted as G(t)=(S(t), C(t)).

A dependency between two software units x and y is denoted as y and is defined in this example as either x=y or $x \rightarrow y$ or $\exists z1, z2, \ldots, zn-1, zn$ so that $x \rightarrow z1 \wedge z1 \rightarrow z2 \wedge \ldots \wedge zn-1 \rightarrow zn \wedge zn \rightarrow y$ Then the dependent software units of the software unit x are in this example denoted as Dsu(x), and are defined by the set of software units $\{z | x \Rightarrow z\}$. Test cases are according to the disclosed subject matter tests to confirm the correct functioning of a section of code. Test cases are known in the art, and are available to the person skilled in the art. According to the disclosed subject matter, any known and suitable type of test case can be employed. In this example for a given a test case T, for which is known that the software units k1, k2, . . . , kn are relevant, then the set K={k1, k2, . . . , kn} is called the known dependent software units of the test case T, denoted as Ksu(T). Furthermore, the set D={d|∃k∈K with k⇒d} is called the dependent software units of the test case T, denoted as Dsu(T). For a given system and at time t, the dependent software units of the test case T is denoted as Dsu(T, t). The dependent software units of the software unit x, denoted as Dsu(x), is defined by the set of software units $\{z | x \Rightarrow z\}$.

To determine the dependencies among the software units comprised in the software code, in one example implementation of the disclosed subject matter use is made of a dependency graph. The dependency graph indicating the interdependency within the software code, and in particular between the software units, is according this example made by a software unit dependency graph generator 300, as shown in FIG. 1. In this example the generator functions as follows. An initial set of software units 350 is taken as input; this initial set can be, for example, code of a certain version of a software program or code. In particular this can be a basis or start version of the software, for instance a current or actual version. Then for each software unit in the initial set 350 a caller software unit 330 is determined. The code 310 is then scanned for each software unit 320 in the initial set 350, and for each software unit found out which software units are called, and store the found caller and called software units as pairs in a database 340. Consecutively, the code is scanned of all identified called software units 360, and the dependencies are located and also stored in the database 340. With the stored sets of pairs linking caller and called software units S, the complete set C of direct dependencies of all software units in the code is known. The information in the database 340 can be expressed in a software unit dependency graph G that is dependent on S and C, in formula G=(S, C).

Figure 2:
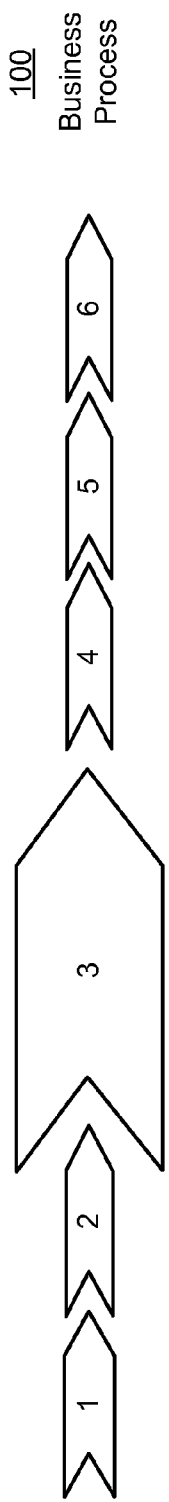
FIG. 2 is a representation of an example of a section of coding according to the disclosed subject matter.
Figure 2:
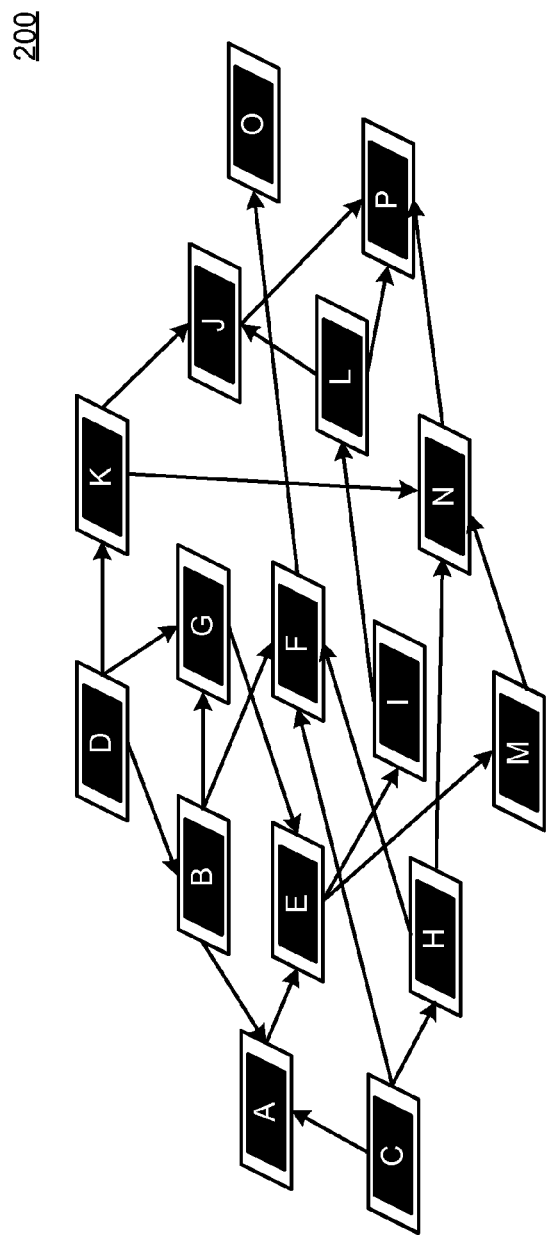

In FIG. 2 a schematic of a business process 100 is shown. This business process 100 comprises the consecutive steps or actions 1, 2, 3, 4, 5, and 6, as indicated by the numbers 1, 2, 3, 4, 5, and 6. Below business process 100 is displayed a schematic indication of computer code 200, like an object oriented code like ABAP. The code 200 is comprised of several objects A, B, C, D, E, F, G, H, I, J, K, L, M, N, 0, and P (herein 'A-P'). The relations between the objects A-P is indicated by arrows. An arrow signifies a dependency between the respective objects. The relations can be any relation, in particular those listed above under the properties of objects in object oriented programming like encapsulation, inheritance and polymorphism.

Figure 3:
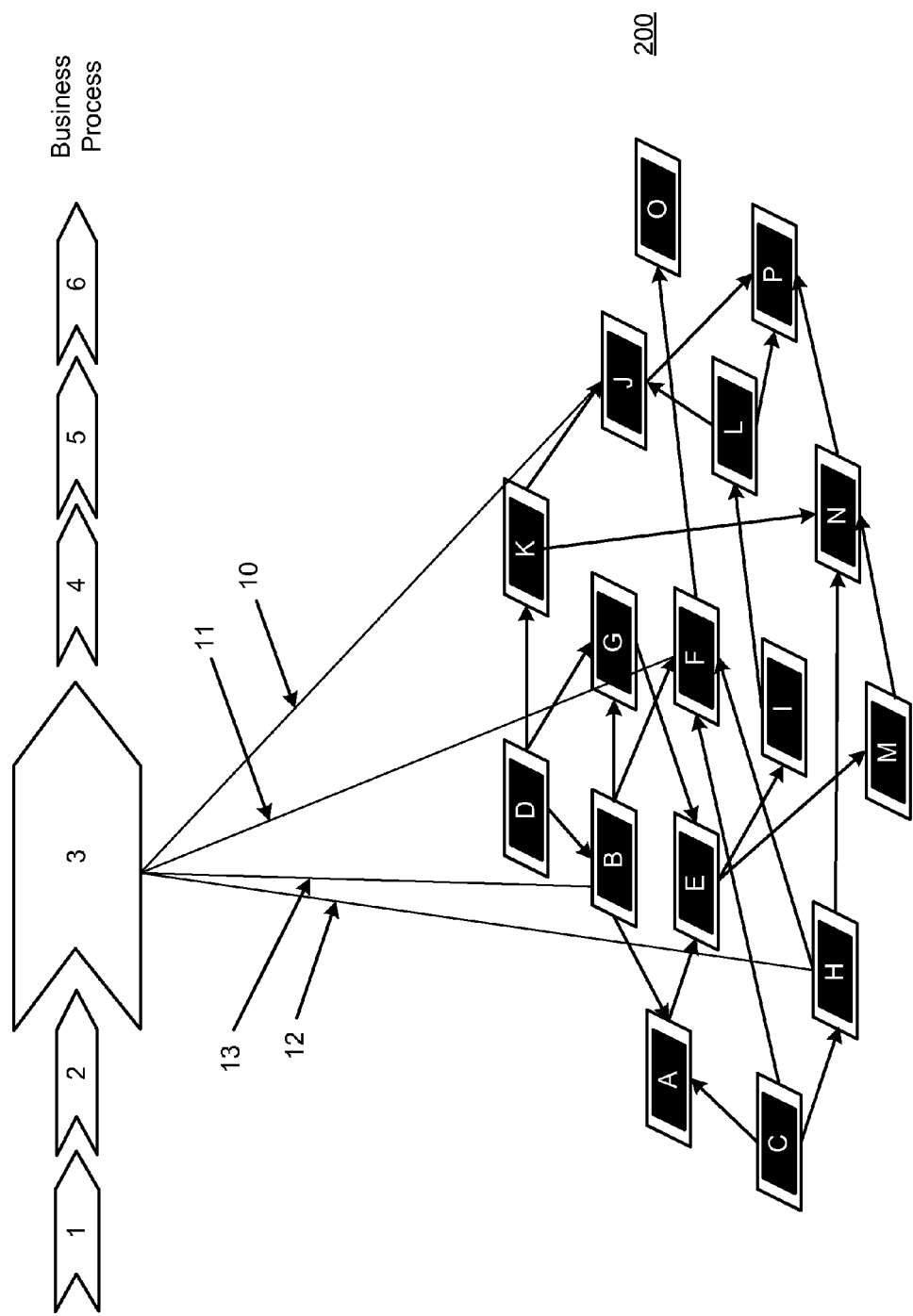
FIG. 3 is a representation of an example of a section of coding according to the disclosed subject matter.

In FIG. 3 the arrows 10, 11, 12, and 13 indicate objects that are used or called by the step or action 3 of the business process.

Figure 4:
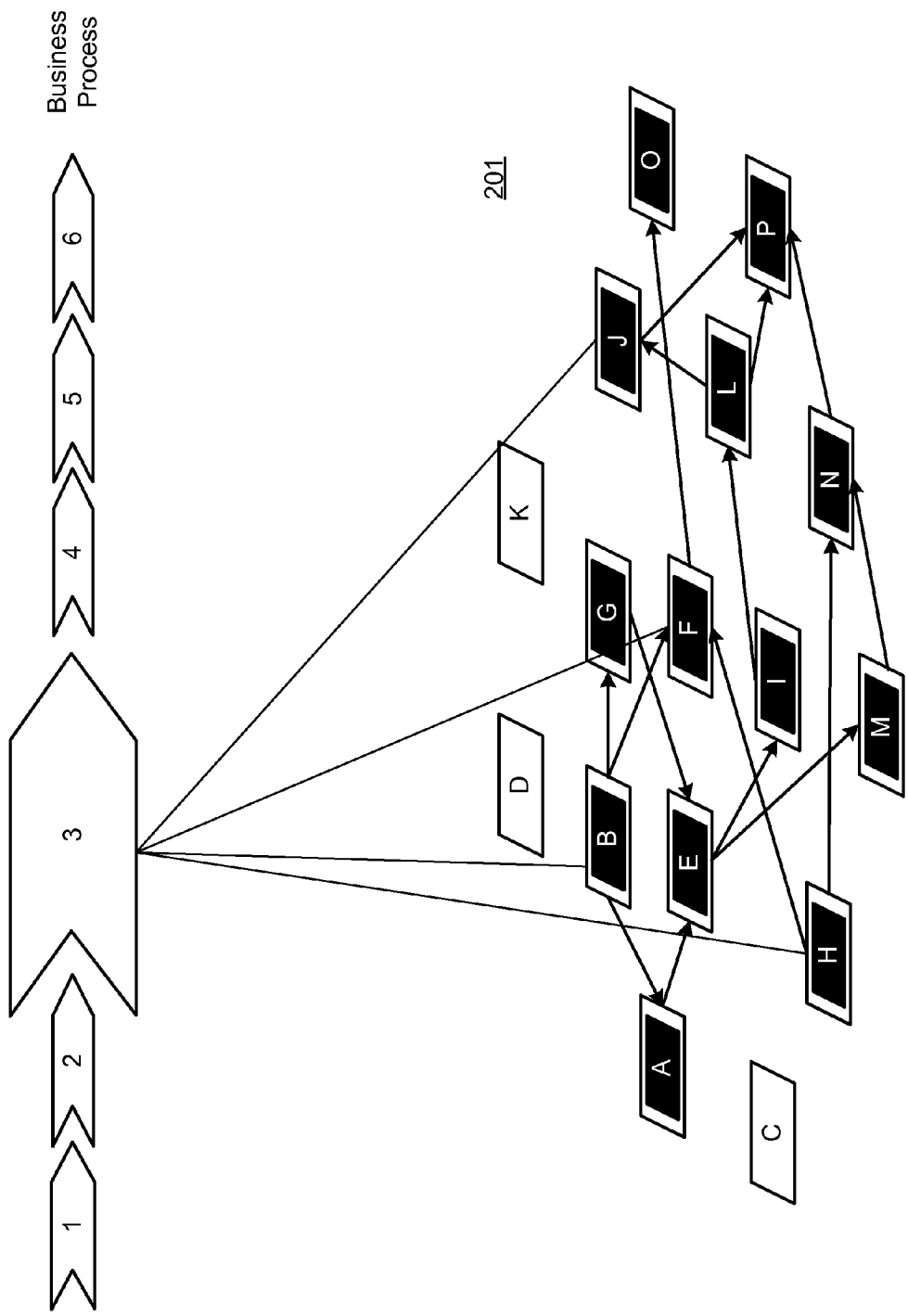
FIG. 4 is a representation of an example of a section of coding according to the disclosed subject matter.

In FIG. 4 a code change is depicted. Here the objects C, D, and K are deleted or removed from the now changed or amended code 201. Note that the relationships of the objects C, D, and K are also removed. This directly impacts the elements N, G, B, A, and H, as they had relations with the removed elements C, D, and K as shown in FIG. 2.

Figure 5:
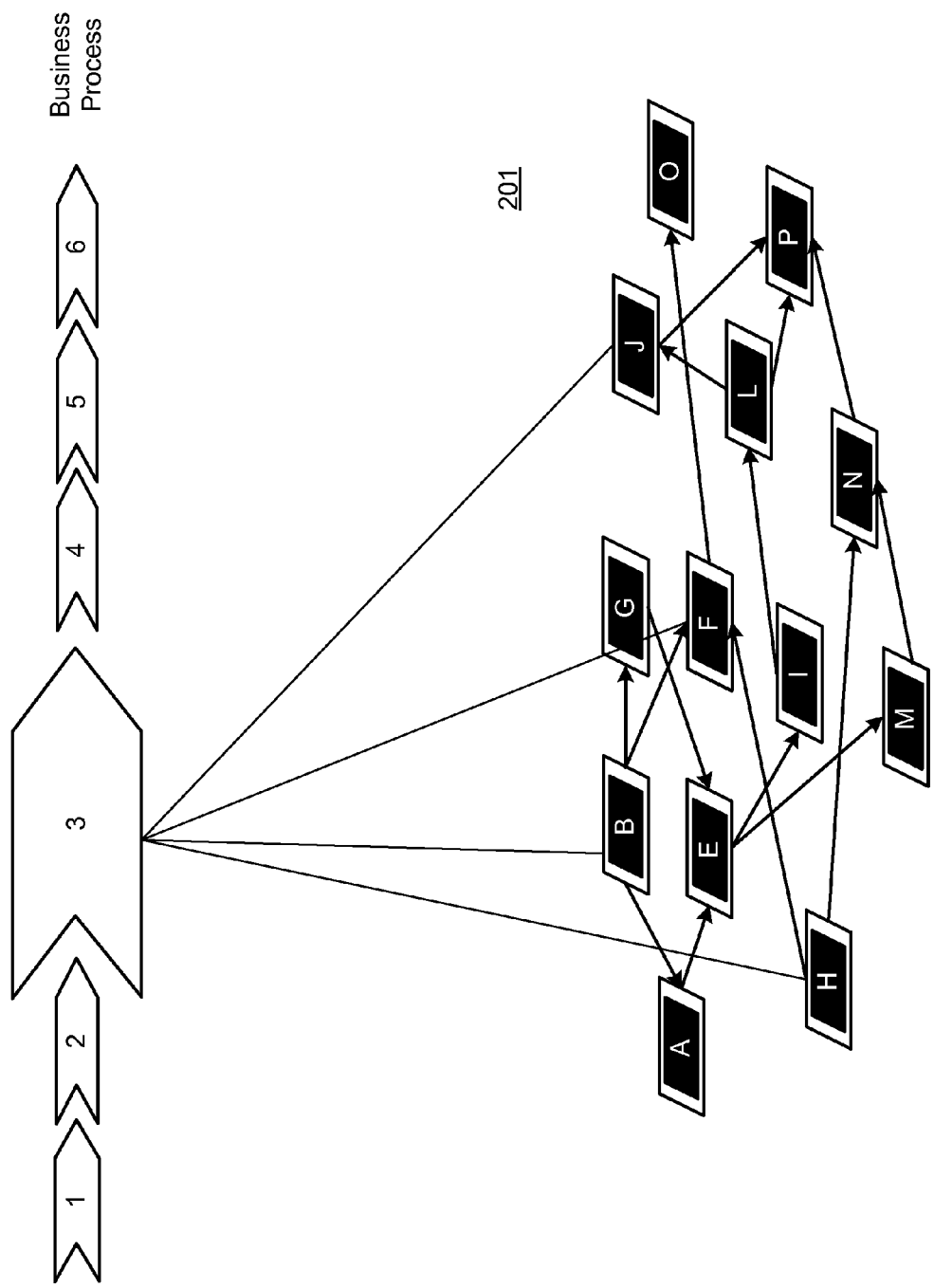
FIG. 5 is a representation of an example of a section of coding according to the disclosed subject matter.

In FIG. 5 the final changed code 201 is shown without the removed objects C, D, and K.

Figure 6:
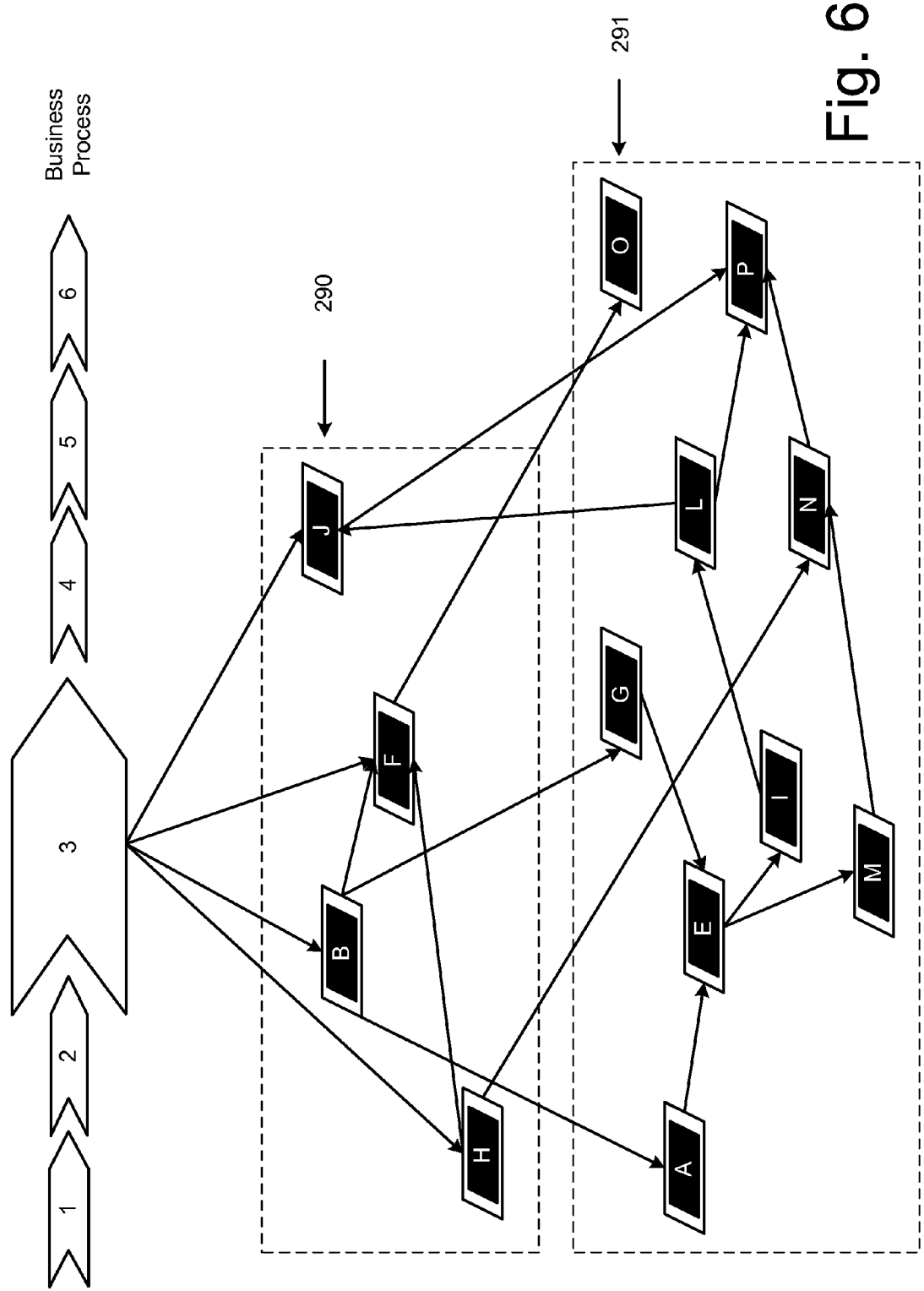
FIG. 6 is a representation of an example of a section of coding according to the disclosed subject matter.

In FIG. 6 the code elements in the form of objects B, F, J, and H are shown at 290, elevated above the other code elements at 291. These objects B, F, J, and H are code elements that are directly called by the business process step or action 3. According to the disclosed subject matter, these code elements have a higher impact factor.

Figure 7:
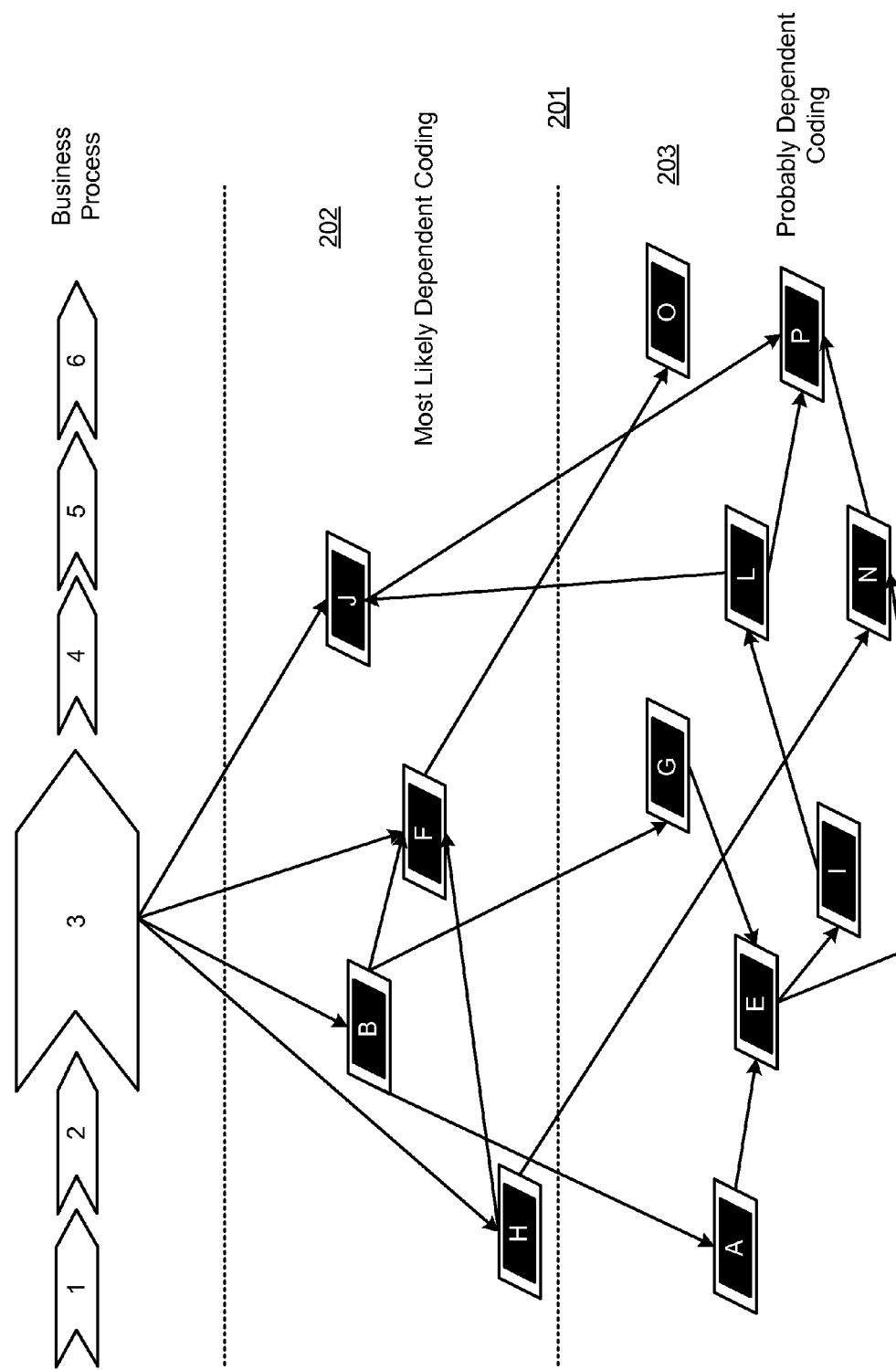
FIG. 7 is a representation of an example of a section of coding according to the disclosed subject matter.
Figure 8:
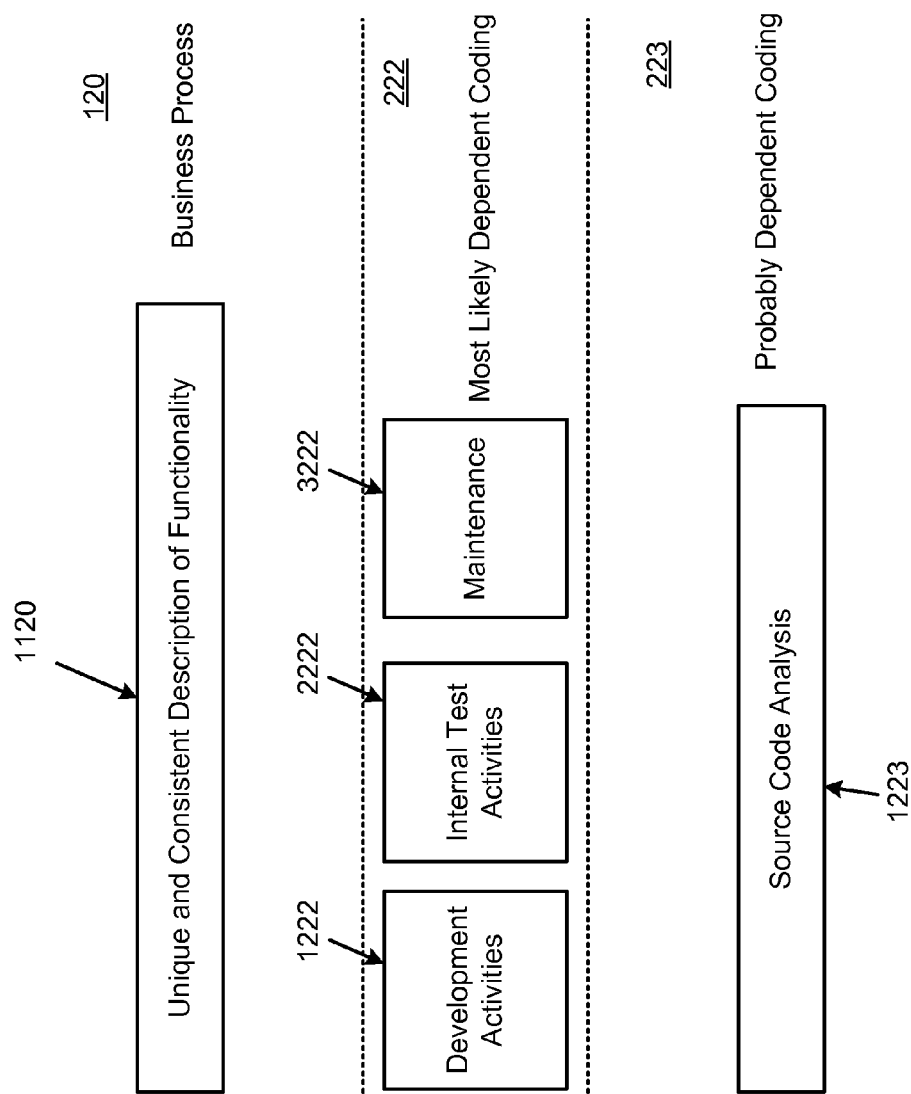
FIG. 8 is a representation of an example of an impact analysis according to the disclosed subject matter.

In FIG. 7 the code elements are arranged in two code section areas 202 and 203, where the code section area 202 has a high impact factor and the code section area 203 has a low impact factor.

Another aspect of the disclosed subject matter is to provide for a dependent software unit collector. In one example of the disclosed subject matter the dependent software unit collector is implemented to collect known relevant software units for use as a considered test case. In a first example of an implementation of the dependent software unit collector according to the disclosed subject matter, the dependent software unit collector is functional to receive information for each test case information about the relevant software units for example from external sources or for example by manual entry. The received information can, for example, be saved in the known dependency database (KDDB) that saves Test Case and Software Unit pairs. The known dependency database saves actually the dependent software units Ksu(T) for each test case T. For each internal message, the reporter is asked to enter all related transports mentioned in the message and the related test case into a database while confirming the message.

In another example of an implementation of the dependent software unit collector according to the disclosed subject matter, the dependent software unit collector may be configured to perform the following tasks for one or more internal message created out of a test case; check for related corrective measures, determine related transports, determine and retrieve corresponding software units in those transports, and save the respective found software units and the test case in the known dependency database.

According to the disclosed subject matter, any other known suitable way of determining the dependency of software units can be used, and the disclosed subject matter is not limited to the examples shown of determining dependency. Using a dependency graph can be effective, but the disclosed subject matter is not limited to this exemplary embodiment.

According to one aspect of the disclosed subject matter, provides for a code change tracker, for example in the form of a utility application installed in the software development environment or system. The code change tracker is provided with functionality to scan transports into the software development environment in a specified timeframe. Also provided is for functionality to Retrieve software units in those transports that have been impacted by code changes and calculate the count of changes for each software unit. The determined and calculated code changes can be stored a database, for example by saving data with the identification of a code unit and the associated number of changes, for example in a software unit change database (CHDB).

One task that can be performed by the software unit dependency analyzer according to the disclosed subject matter is to extract all distinct software units from the known dependency database to a set of software units. This set of software units can be used as input for the software unit dependency graph generator. By combining the resulting software unit dependency graph and the known dependency database to build the test case-software unit dependency can build a database (DDB) which is technically the same as the known dependency database. In one aspect of the disclosed subject matter the DDB can save the dependent software units Dsu(T) for each test case T.

According to the disclosed subject matter, the same smallest granularity level for code changes can be used, as that is used in a SAP transport system or software development environment while describing code changes. This can for example include the program-level, like for example ABAP object classes, function groups, or reports and for include-level ABAP object methods, function modules, or includes. According to the disclosed subject matter, support filtering and clustering of coding on the different levels, for instance software layer, can be implemented in the corresponding software logistic system, like a SAP system. The identification of code changes can be made using for example by analyzing the object oriented class library. Possible changes can for example be data changes including adding new data and deleting existing data, for example changes in definition or declaration. Other changes can for example method changes like component changes, interface changes, and control structure changes. Also a class change can be an example of code changes.

The impact of code changes on the product quality of the code can be assessed according to the disclosed subject matter on several aspects, for example two complimentary aspects like the changes in the internal dependencies between different parts of coding in a given timeframe and the changes within the smallest traceable code unit in a given timeframe.

According to the disclosed subject matter, the impact of code changes can be assessed by for example ranking the impact of the code changes, for example according to the complexity and sensitivity of the software or the impacts of code changes on the quality.

In another aspect of the disclosed subject matter, another approach can be used to evaluate the impact of code changes on product quality, in particular one that is not-deterministic. In this implementation of the disclosed subject matter the dependent software unit collector is used as described before. Also the software unit dependency graph generator is used as described before. Also, accordingly, the code change tracker is used to monitor code changes. According to this embodiment of the disclosed subject matter, the software unit dependency analyzer and the impact assessment engine, can perform the following approach, which is in this example not-deterministic inference.

In one first step or action the directions in the relationships in the software unit dependency graph are removed and converted into a not-directed graph. In another second step or action, the all related test cases are determined for each software unit in the known dependency database.

In another third step or action is to find out the nearest n test cases in the not-directed graph which was generated in a former step. For this and for each changed software unit in the software unit change database and a given number n, any suitable known processes be used to find a forth step according to the disclosed subject matter in which data gathered in step three is collected and a ranking is determined, for example by provide a ascending or descending ranking on the affected test cases.

The disclosed subject matter is not limited to the shown example of deriving a dependency graph; the disclosed subject matter can be implemented with any known suitable means or method of deriving or determining the interdependencies between units in coding.

After determining the changes the impact of the changes on the code can be determined. According to one example of an embodiment of the disclosed subject matter, the impact of the code changes to the code is determined by a ranking based approach. To this end, an impact factor is associated with each code change, and the code changes are ranked according to its respective code change impact factor.

In one embodiment of the impact assessment engine according to the disclosed subject matter, the impact assessment engine provides quantitative assessment on a given system and in a given timeframe, specified by the start time ts and the end time te.

In this example the impact assessment engine first calculates three key impact factors for each test case T. According to the disclosed subject matter any number of key impact factors can be used, however.

First there is the impact factor regarding the dependency changes for test case T, represented by $|Dsu(T,ts)|$, $|Dsu(T,te)|-|Dsu(T,ts)|$ and $|Dsu(T,te)|$, wherein $|Dsu(T,t)|$=the cardinality of $Dsu(T,t)$. Second impact factor is the number of relevant changes in dependent software units for test case T, represented by the number of relevant changes, calculated as the sum of "# of changes" in the software change database for all respective software units in $Dsu(T,te)$. Third exemplary impact factor is the number of changes due to changed dependencies, calculated as the sum of "# of changes" in the software change database for all software units in $Dsu(T,te)\backslash Dsu(T,ts)$, wherein $Dsu(T,te)\backslash Dsu(T,ts)=\{s|s\in Dsu(T,te) \wedge s\notin Dsu(T,ts)\}$.

Then, in this example of the disclosed subject matter, the Impact assessment engine determines and saves the following information into a database: test case identifier, $|Dsu(T,ts)|$, $|Dsu(T,te)|-|Dsu(T,ts)|$, $|Dsu(T,te)|$, the number of relevant changes and the number of changes due to changed dependencies. This is by no means a limiting listing of impact factors, and according to the disclosed subject matter, any other kind and number of data with respect to the impact factors can be determined and stored.

After determining the impact factors, the determined and collected results can be ranked, for example by ranking the key impact factors. In FIG. 7 an implementation of an example of a ranking according to the disclosed subject matter is shown. For the business process 120 as coded in 1120 two levels of ranking are provided. The higher level 222 describes the most likely dependent coding 222 that can result from code changes associated with activities like development activities 1222, internal test activities 2222, or maintenance activities 3222. In the lower level 223 source code analysis based changes 1223 are shown that are likely to comprise probable dependent coding.

By quantitatively assessing the impact of the respective code changes on the test case by means of different key impact factors, rankings over the key impact factors for the considered test cases can be determined. Based on the ranking, tests can be determined. By making a selection of test to be performed, based on the determined code complexity and code evolution in the form of code changes, software testing can be optimized with respect to the available resources, improve predictions of tests on quality. After determining the ranking the corresponding test cases are selected and the selected test cases are run against the code. Performing test cases against code is known in the art, and any suitable test system and method can be employed. The result of the tests is recorded, stored in a database, and reported. Also the reporting of the test results is known in the art, and according to the disclosed subject matter any suitable means of testing can be employed.

Figure 9:
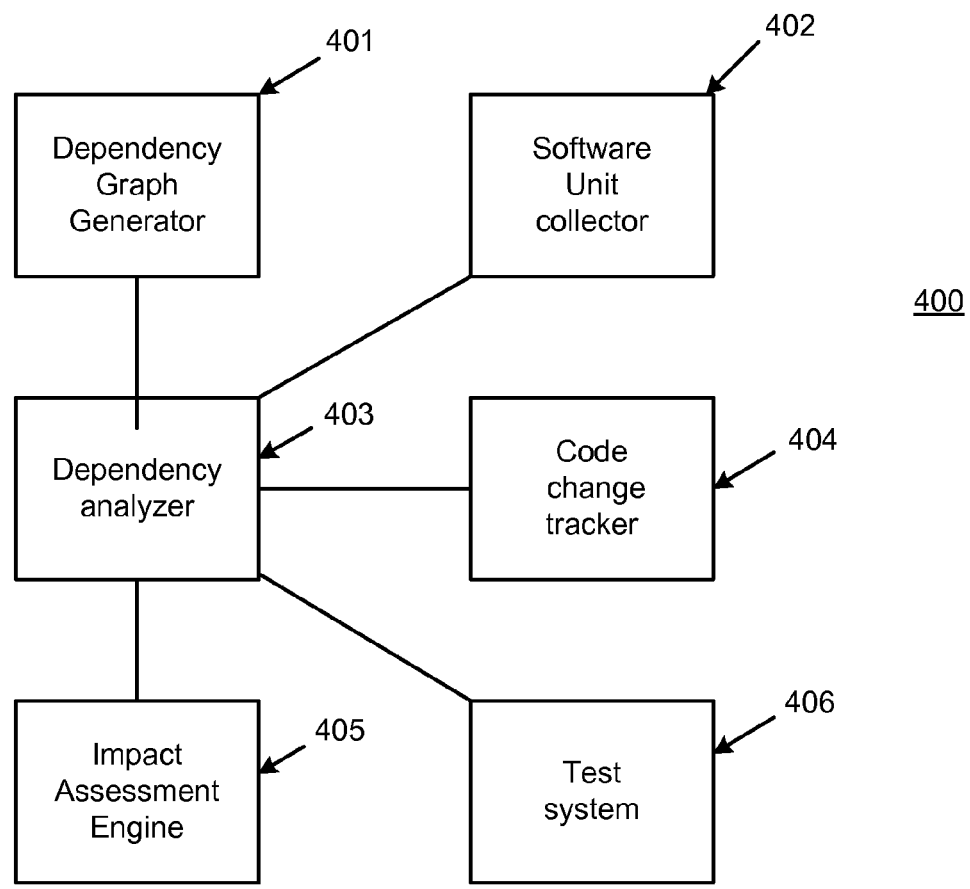
FIG. 9 is a representation of an example of a system according to the disclosed subject matter.

FIG. 9 shows an example of a system 400 according to an embodiment of the disclosed subject matter. The system 400 comprises a dependency graph generator 401 as described above. Further comprised are a software unit collector 402 and a dependency analyzer 403, described respectively in the former. Additionally, comprised is a code change tracker 404 according to the disclosed subject matter described above and an impact assessment engine 405 according to the disclosed subject matter mentioned before. Furthermore a test system 406 is part of the system 400 that is implemented to conduct test according to the disclosed subject matter as described above.

A weighting mechanism for connections in a software unit dependency graph can help differentiate between important while for example heavily used dependencies and the less important ones. This will enhance the accuracy and reliability of the assessments.

The disclosed subject matter can be used for any computer programming code that has discernible software units. The idea itself is not only applicable for SAP-related software development projects, but also for software development projects utilized with a software logistic system which supports code change tracking Embodiments of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry, like for example hardware accelerated computing.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for testing software code in a computer system comprising:
   identifying a set of code tests associated with the software code;
   identifying, for each code test of the set of code tests, relevant code elements of the software code,
   determining, by a code change tracker implemented using at least one processor executing instructions stored on at least one non-transitory computer-readable storage medium, changed code elements in the software code;
   determining, by a dependency analyser implemented using at least one processor executing instructions stored on at least one non-transitory computer-readable storage medium, dependencies between the code elements and dependency changes between code elements based on the determined changed code elements;
   determining, by an impact assessment engine implemented using at least one processor executing instructions stored on at least one non-transitory computer-readable storage medium, impact factors for each of the respective changed code elements based on the determined dependency changes, each impact factor predicting a potential failure of future tests conducted using at least one of the set of code tests;
   selecting a subset of the set of code tests for the software code based on the identified relevant code elements and on the impact factors; and
   performing using at least one processor executing instructions stored on at least one non-transitory computer-readable storage medium, the selected subset of code tests on the software code.

2. The method according to claim 1, further comprising determining a dependency between code elements based on a dependency graph.

3. The method according to claim 1, further comprising storing test results gained with performing the selected subset of code tests in a database.

4. The method according to claim 1, the method further comprising determining the impact factor based on a weighing evaluation.

5. The method according to claim 1, wherein determining changed code elements comprises storing an identification of the determined changed code element(s) and an associated number of changes in a database.

6. The method according to claim 1, wherein determining an impact factor for the respective changed code elements comprises determining the impact factor based, at least in part, upon changes in the internal dependencies between respective code elements within one or more predetermined timeframes.

7. The method according to claim 1, wherein determining an impact factor for the respective changed code elements comprises ranking the impact of the changes within the changed code elements according to the complexity and sensitivity of the code elements.

8. The method according to claim 1, further comprising:
   determining a dependency between code elements based on a dependency graph;
   converting the dependency graph into a non-directed graph;
   selecting the selected subset of code tests for the software code based on said dependency changes and on the non-directed graph;
   executing the selected subset of code tests; and
   evaluating the impact of the changed code elements on the tested software code.

9. An apparatus comprising:
   a collector implemented using at least one processor executing instructions stored on at least one non-transitory computer-readable storage medium and configured to:
      identify a set of code tests associated with software code, and
      identify, for each code test of the set of code tests, relevant code elements of the software code a code change tracker implemented using at least one processor executing instructions stored on at least one non-transitory computer-readable storage medium and configured to:
    determine changed code elements in the software code;
a dependency analyser configured to:
    determine dependencies between the code elements, and
    determine dependencies between the code elements and dependency changes between code elements based on the determined changed code elements;
an impact assessment engine implemented using at least one processor executing instructions stored on at least one non-transitory computer-readable storage medium and configured to:
    determine impact factors for each of the respective changed code elements based on the determined dependency changes, each impact factor predicting a potential failure of future tests conducted using at least one of the set of code tests, and
a test system implemented using at least one processor executing instructions stored on at least one non-transitory computer-readable storage medium and configured to:
    select a subset of the set of code tests for the software code based on the identified relevant code elements and on the impact factors, and
    perform the selected subset of code tests on the software code.

10. The apparatus of claim 9, further comprising a dependency graph generator configured to generate a dependency graph showing dependencies between code elements; and
    wherein the dependency analyser is configured to determine dependencies between the code elements based, at least in part, upon the dependency graph.

11. The apparatus of claim 9, wherein the test system is configured to store test results, gained as a result of performing the selected subset of code tests, in a database.

12. The apparatus of claim 9, wherein the impact assessment engine is configured to determine the impact factor based on a weighing evaluation.

13. The apparatus of claim 9, wherein the code change tracker is configured to store an identification of the determined changed code element(s) and an associated number of changes in a database.

14. The apparatus of claim 9, wherein the impact assessment engine is configured to determine the impact factor based, at least in part, upon changes in the internal dependencies between respective code elements within one or more predetermined timeframes.

15. The apparatus of claim 9, wherein the impact assessment engine is configured to rank the impact of the changes within the changed code elements according to the complexity and sensitivity of the code elements.

16. The apparatus of claim 9, wherein the dependency analyser is configured to:
    determine a dependency between code elements based on a dependency graph, and
    convert the dependency graph into a non-directed graph; and
wherein the impact assessment engine is configured to:
    select the selected subset of code tests for the software code based on said dependency changes and on the non-directed graph, and
    evaluate the impact of the changed code elements on the software code based, at least in part, upon the selected code tests.

17. An article of manufacture having computer readable instructions stored on at least one non-transitory computer-readable storage medium for execution by a processor to perform a method for testing software code, the method comprising:
    identifying a set of code tests associated with the software code;
    identifying, for each code test of the set of code tests, relevant code elements of the software code,
    determining changed code elements in the software code;
    determine dependency changes between code elements based on the determined changed code elements;
    determining impact factors for each of the respective changed code elements based on the determined dependency changes, each impact factor predicting a potential failure of future tests conducted using at least one of the set of code tests;
    selecting a subset of the set of code tests for the software code based on the identified relevant code elements and on the impact factors; and
    performing, using at least one processor executing instructions stored on at least one non-transitory computer-readable storage medium, the selected subset of code tests on the software code.

18. The article of manufacture according to claim 17, having computer readable instructions stored thereon for execution by a processor to perform a method for testing software code, the method further comprising determining the dependency between code elements based on a dependency graph.

19. The article of manufacture according to claim 17, having computer readable instructions stored thereon for execution by a processor to perform a method for testing software code, the method further comprising storing test results gained with performing the selected subset of code tests in a database.

20. The article of manufacture according to claim 17, having computer readable instructions stored thereon for execution by a processor to perform a method for testing software code, the method further comprising determining the impact factor based on a weighing evaluation.

* * * * *